United States Patent [19]

Petrella

[11] 4,134,226

[45] Jan. 16, 1979

[54] FISHING CRAB TRAP

[76] Inventor: Ronald Petrella, I-15 Sutton Dr., Matawan, N.J. 07747

[21] Appl. No.: 827,122

[22] Filed: Aug. 24, 1977

[51] Int. Cl.$^2$ ............................................. A01K 71/00
[52] U.S. Cl. ........................................................ 43/102
[58] Field of Search ................ 43/100, 102, 103, 105, 43/62

[56] References Cited

U.S. PATENT DOCUMENTS

| 2,586,350 | 2/1952 | Lamb | 43/105 |
| 2,639,540 | 5/1953 | Buford | 43/102 |
| 2,679,125 | 5/1954 | Howard | 43/102 |

Primary Examiner—Robert C. Watson

[57] ABSTRACT

A crab trap that opens automatically when dropped in the water and closes immediately when pulled out of the water, said crab trap designed to provide a top chamber of screened enclosure and having a buoyant layer of styrofoam in the upper chamber to lift said upper portion when in the water. A handle that extends through said upper portion of said trap to a screened bottom panel and slidably affixed to the upper portion of the crab trap. A tie rope for dropping said crab trap into the water and two ends of said tie rope extending through the top center of said crab trap, and layer of styrofoam, and each end extending down through said bottom panel around the screening and back up to be tied on opposite sides of said trap, so that a pull upward of the tie rope will first pull said bottom panel closed against said top portion and then lift said crab trap out of the water.

2 Claims, 4 Drawing Figures

U.S. Patent      Jan. 16, 1979      4,134,226
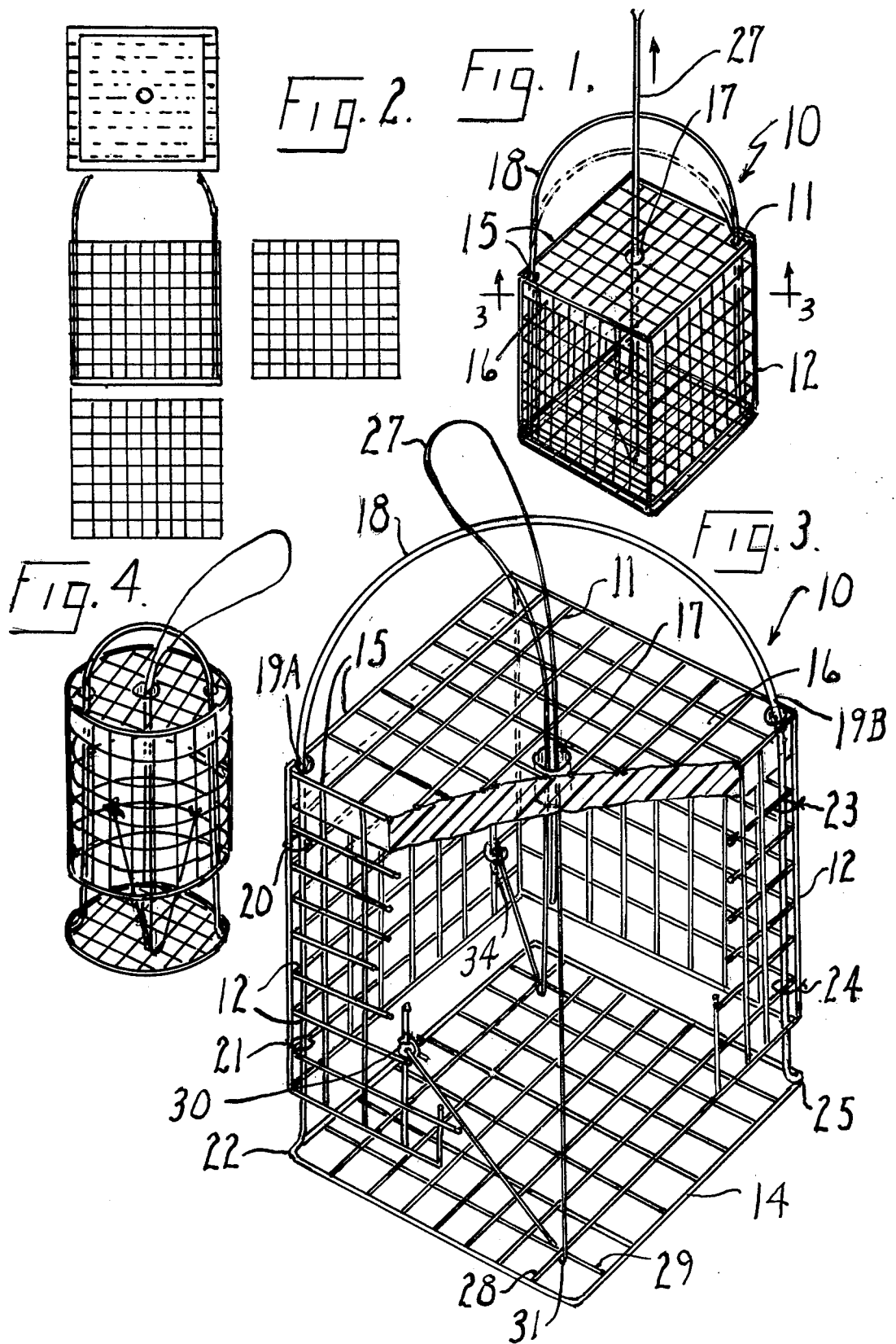

FISHING CRAB TRAP

This invention relates to crab carts or more specifically a crab trap utilized to be dropped in the water where crabs are to be found, and so constructed that the trap automatically opens and remains open while in the water. The trap being suspended by a cord or line, so that when the line is pulled the trap will close and so capture any crab within the trap. The refinement of this device over the prior well known traps is the manner in which the trap opens and closes due to its different construction.

More specifically it is an object of this invention to provide a crab trap that automatically opens in water and is immediately closed by a pull on the line to lift the trap out of the water.

A further object of this invention is to provide a crab trap that will automatically open in water before reaching the bottom and therefore can be used in deep water such as around pilings where crabs tend to gather.

Further objects may be apparent by reference to the following detailed description and the drawings in which FIG. 1 is a perspective view of the crab trap in an open position, FIG. 2 is an exploded view of the crab trap elements, FIG. 3 is an enlarged cross sectional view taken on line 3—3 of FIG. 1, and FIG. 4 is a similar type crab trap in a round or circular form.

Referring to the drawings there is illustrated in FIG. 1 a crab trap 10 provided with six screen type panels, a top 11, four side panels 12 and a bottom panel 14. The four side panels are joined to form a boxlike body that is rigid. The top 11 is attached to the upper edge 15 of each side panel, thus strengthening the boxlike form. A styrofoam panel 16 is affixed to the inner side of panel 11. There is an aperture 17 in the center of panel 16. A handle 18 is provided. Handle 18 spans the crab trap, that is, the handle extends above the crab trap. One leg 19A extends through a loop 20 that is affixed to the upper corner or meeting panels 12, and through a loop 21 affixed to the lower portion of the meeting panels 12 and is rigidly affixed to the corner 22 of the bottom panel 14. On the opposite side of the crab trap a leg 19B of the handle 18 extends through a loop 23 at the upper corner of meeting panels 12, and extends downward through a loop 24 affixed to the lower portion of the meeting panels 12 and is rigidly affixed to the corner 25 of the bottom panel 14. The handle 18 and the lower panel 14 are thus joined as a rigid structure. The legs 19A and 19B being retained in opposite corners of the crab trap. It is apparent that the lower screen 14 can be lowered below the bottom edge of the boxlike body of screens 12 thus providing access to the interior of the crab trap. The upper or top of the crab trap is closed by the top 11 that is attached to all four top edges of panels 12. However in addition a styrofoam panel 16 is affixed to the inner surface of the top 11. This is to provide buoyancy to the crab trap, so that when the trap is thrown in the water the styrofoam panel 16 tends to rise or float, while the cart tends to sink. The weight of the cart will cause it to sink, but the buoyancy of the top panel will cause the cart to assume an open position as the top panel pulls upward. Thus the cart when dropped in water will always assume an open position. It is necessary to provide a pull string or cord 27. The cord 27 is passed through an aperture 17 in the styrofoam panel 16 and down to the bottom panel 14. To give balance to the movement of the bottom panel 14, one end of the cord is passed through panel 11 and styrofoam panel 16 at its center and extends downward to a corner 31 of the trap and around two of the screen bars 28 and 29 of bottom 14 and passed upward to be attached to a bar 30 of a side panel 12, while the other end of the cord is passed through panel 11 and styrofoam panel 16 at its center and extends downward to an opposite corner 32 of the trap and around two of the screen bars 28 and 29 of the bottom 14 and passed upward to be attached to a bar 34 of a side panel 12. Thus when the crab trap rests within the water or on the bottom, the buoyancy of the styrofoam panel 16 will cause the upper portion of the trap to pull and lift upward, while the loose bottom 14 will remain at rest on the bottom, thus opening the trap. When crabbing the panel 14 will have bait affixed to it to attract the crabs. The crabs will enter the open crab cart between panels 12 and bottom 14. When the crabs are in the cart, the string 27 is pulled upward. This pulls the bottom 14 up to abut the lower edges of panels 12 and traps the crabs within. The cart is pulled out of the water by string 27 and when on dry land or dry boat, the cart can be opened and the crabs removed.

Although we have described this device in detail it is to be understood that various modifications of the apparatus, such as the shape of the cart may be made without departing from the spirit or the scope thereof, and this invention is limited only to the structure as designated in the appended claims.

What is claimed is:

1. A crab capturing basket referred to as a crab cart that comprises four open screening sides formed in a boxlike form with a bottom screen and a top screen in which a floatation packing is affixed to the top screen and the top screen is affixed to all four sides and said unattached bottom screen is attached to a handle, said handle slidably affixed to said basket to permit said bottom screen to drop away from said four sides when said floatation packing is lifted by buoyancy in the water, a tethering rope connected to said crab basket, both ends of said rope passed through said top screen and through said floatation packing and through said bottom screen and tied to opposite sides of said basket above the bottom screen, said bottom screen to be pulled closed against the bottom edge of said sides when said tethering rope is pulled to lift said basket out of the water.

2. A crab capturing basket referred to as a crab cart that comprises a single open screened cagelike form with a bottom screen and a closed single body screen, a floatation packing affixed to an open body screen, said bottom screen attached to a handle, said handle slidably affixed to said single bodylike form to permit said bottom screen to drop away from said single bodylike form when said floatation packing is lifted by buoyancy in the water, a tethering rope connected to said crab cart, both ends of said rope passed through said open top screen and floatation packing and extending to the bottom screen, said rope passing through said bottom screen and tied to opposite sides of said screened cagelike form above the bottom screen, said bottom screen pulled closed against the bottom edge of said screened cagelike form by said tethering rope when it is pulled to lift said crab basket out of the water.

* * * * *